United States Patent
Oki

(10) Patent No.: US 11,458,831 B2
(45) Date of Patent: Oct. 4, 2022

(54) COOLING SYSTEM

(71) Applicant: SUBARU CORPORATION, Tokyo (JP)

(72) Inventor: Shogo Oki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 334 days.

(21) Appl. No.: 16/589,674

(22) Filed: Oct. 1, 2019

(65) Prior Publication Data

US 2020/0171935 A1 Jun. 4, 2020

(30) Foreign Application Priority Data

Dec. 3, 2018 (JP) .............................. JP2018-226531

(51) Int. Cl.
*B60K 11/02* (2006.01)
*B60L 1/00* (2006.01)
*B60L 58/26* (2019.01)
*B60K 1/00* (2006.01)

(52) U.S. Cl.
CPC .............. *B60K 11/02* (2013.01); *B60L 1/003* (2013.01); *B60L 58/26* (2019.02); *B60K 2001/005* (2013.01); *B60K 2001/006* (2013.01); *B60L 2240/36* (2013.01)

(58) Field of Classification Search
None
See application file for complete search history.

(56) References Cited

U.S. PATENT DOCUMENTS

2010/0050676 A1  3/2010 Takamatsu et al.
2016/0318370 A1* 11/2016 Rawlinson ............ B60L 3/0061
2018/0029463 A1* 2/2018 Ajisaka .................. B60K 11/04
2018/0050605 A1* 2/2018 Lewis ...................... B60K 11/02
2018/0118014 A1* 5/2018 Wantschik ............. B60K 11/00
2019/0068028 A1* 2/2019 Tominaga ............... H02K 7/006
2019/0070924 A1* 3/2019 Mancini ............ B60H 1/32281
2020/0164718 A1* 5/2020 Takei ....................... B60L 58/26

FOREIGN PATENT DOCUMENTS

| JP | 2007-202244 A | 8/2007 |
| JP | 2008-189249 A | 8/2008 |
| JP | 2009-126256 A | 6/2009 |
| JP | 2011-182607 A | 9/2011 |
| JP | 2012-211432 A | 11/2012 |

OTHER PUBLICATIONS

Japanese Office Action dated Jul. 5, 2022, in corresponding Japanese Patent Application No. 2018-226531, with an English translation thereof.

* cited by examiner

*Primary Examiner* — Jared Fureman
*Assistant Examiner* — Joel Barnett
(74) *Attorney, Agent, or Firm* — McGinn I.P. Law Group, PLLC.

(57) ABSTRACT

A cooling system includes a circulation channel, a first switching valve, a second switching valve, and a controller. The circulation channel allows a cooling medium to circulate in order of a radiator, a battery, an inverter, a motor, and the radiator. The first switching valve allows the cooling medium to bypass the radiator in the circulation channel. The second switching valve allows the cooling medium to bypass the motor in the circulation channel. The controller controls the first switching valve and the second switching valve on the basis of a battery temperature of the battery, an inverter temperature of the inverter, and a motor temperature of the motor.

20 Claims, 17 Drawing Sheets

|  | STATE S1 |  | STATE S2 |  |
|---|---|---|---|---|
| SWITCHING VALVE A | IN1->OUT | COOLING MEDIUM FLOWS VIA RADIATOR 11 | IN2->OUT | COOLING MEDIUM BYPASSES RADIATOR 11 |
| SWITCHING VALVE B | IN->OUT1 | COOLING MEDIUM FLOWS VIA MOTOR 15 | IN->OUT2 | COOLING MEDIUM BYPASSES MOTOR 15 |
| SWITCHING VALVE C | IN->OUT1 | COOLING MEDIUM FLOWS VIA BATTERY 13 | IN->OUT2 | COOLING MEDIUM BYPASSES BATTERY 13 |

FIG. 2

| | CONDITION ||| SWITCH-ING VALVE A | SWITCH-ING VALVE B | SWITCH-ING VALVE C | DESCRIPTION |
| --- | --- | --- | --- | --- | --- | --- | --- |
| | MOTOR TEMPERATURE $T_m$ | INVERTER TEMPERATURE $T_{inv}$ | BATTERY TEMPERATURE $T_b$ | | | | |
| OPERATION MODE M1 | BELOW 80° C | BELOW 40° C | BELOW 40° C | S2 | S1 | S1 | USE MOTOR 15 AS HEAT SOURCE TO WARM UP BATTERY 13 |
| OPERATION MODE M2 | BELOW 80° C | — | 40° C OR ABOVE | S1 | S2 | S1 | USE MOTOR 15 AS HEAT SOURCE TO WARM UP TRANSMISSION 17, AND USE RADIATOR 11 TO COOL DOWN BATTERY 13 AND INVERTER 14 |
| OPERATION MODE M3 | 80° C OR ABOVE | — | 40° C OR ABOVE | S1 | S1 | S1 | USE RADIATOR 11 TO COOL DOWN BATTERY 13, INVERTER 14, AND MOTOR 15 |
| OPERATION MODE M4 | 80° C OR ABOVE | — | BELOW 40° C | S1 | S1 | S2 | USE RADIATOR 11 TO COOL DOWN INVERTER 14 AND MOTOR 15 |
| OPERATION MODE M5 | BELOW 80° C | 40° C OR ABOVE | BELOW 40° C | S1 | S2 | S2 | USE RADIATOR 11 TO COOL DOWN INVERTER 14 |

FIG. 3

|  | STATE S1 | | STATE S2 | |
|---|---|---|---|---|
| SWITCHING VALVE A | IN1->OUT | COOLING MEDIUM FLOWS VIA RADIATOR 11 | IN2->OUT | COOLING MEDIUM BYPASSES RADIATOR 11 |
| SWITCHING VALVE B | IN->OUT1 | COOLING MEDIUM FLOWS VIA MOTOR 15 | IN->OUT2 | COOLING MEDIUM BYPASSES MOTOR 15 |
| SWITCHING VALVE CC | IN1->OUT | COOLING MEDIUM FLOWS VIA BATTERY 13 | IN2->OUT | COOLING MEDIUM BYPASSES BATTERY 13 |

FIG. 7

| | CONDITION | | | SWITCH-ING VALVE A | SWITCH-ING VALVE B | DESCRIPTION |
|---|---|---|---|---|---|---|
| | MOTOR TEMPERATURE Tm | INVERTER TEMPERATURE Tinv | BATTERY TEMPERATURE Tb | | | |
| OPERA-TION MODE M11 | BELOW 80° C | BELOW 40° C | BELOW 40° C | S2 | S1 | USE MOTOR 15 AS HEAT SOURCE TO WARM UP BATTERY 13 |
| OPERA-TION MODE M12 | BELOW 80° C | — | 40° C OR ABOVE | S1 | S2 | USE MOTOR 15 AS HEAT SOURCE TO WARM UP TRANSMISSION 17, AND USE RADIATOR 11 TO COOL DOWN BATTERY 13 AND INVERTER 14 |
| OPERA-TION MODE M13 | 80° C OR ABOVE | — | 40° C OR ABOVE | S1 | S1 | USE RADIATOR 11 TO COOL DOWN BATTERY 13, INVERTER 14, AND MOTOR 15 |

FIG. 9

COOLING SYSTEM

CROSS-REFERENCE TO RELATED APPLICATIONS

The present application claims priority from Japanese Patent Application No. 2018-226531 filed on Dec. 3, 2018, the entire contents of which are hereby incorporated by reference.

BACKGROUND

The technology relates to a cooling system used in a vehicle.

Some vehicles including automobiles, such as electric vehicles and hybrid electric vehicles, each include a battery, an inverter, and a motor. For example, Japanese Unexamined Patent Application Publication Nos. 2009-126256 and 2008-189249 each disclose a cooling system that allows a cooling medium to circulate in order of a radiator, an inverter, a motor, a battery, and the radiator.

SUMMARY

An aspect of the technology provides a cooling system including a circulation channel, a first switching valve, a second switching valve, and a controller. The circulation channel is configured to allow a cooling medium to circulate in order of a radiator, a battery, an inverter, a motor, and the radiator. The first switching valve is configured to allow the cooling medium to bypass the radiator in the circulation channel. The second switching valve is configured to allow the cooling medium to bypass the motor in the circulation channel. The controller is configured to control the first switching valve and the second switching valve on the basis of a battery temperature of the battery, an inverter temperature of the inverter, and a motor temperature of the motor.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 2 is a table illustrating one operation example of switching valves illustrated in FIG. 1.

FIG. 3 is a table illustrating one operation example of the cooling system illustrated in FIG. 1.

FIG. 7 is a table illustrating one operation example of switching valves illustrated in FIG. 6.

FIG. 9 is a table illustrating one operation example of the cooling system illustrated in FIG. 8.

DETAILED DESCRIPTION

Figure 1:
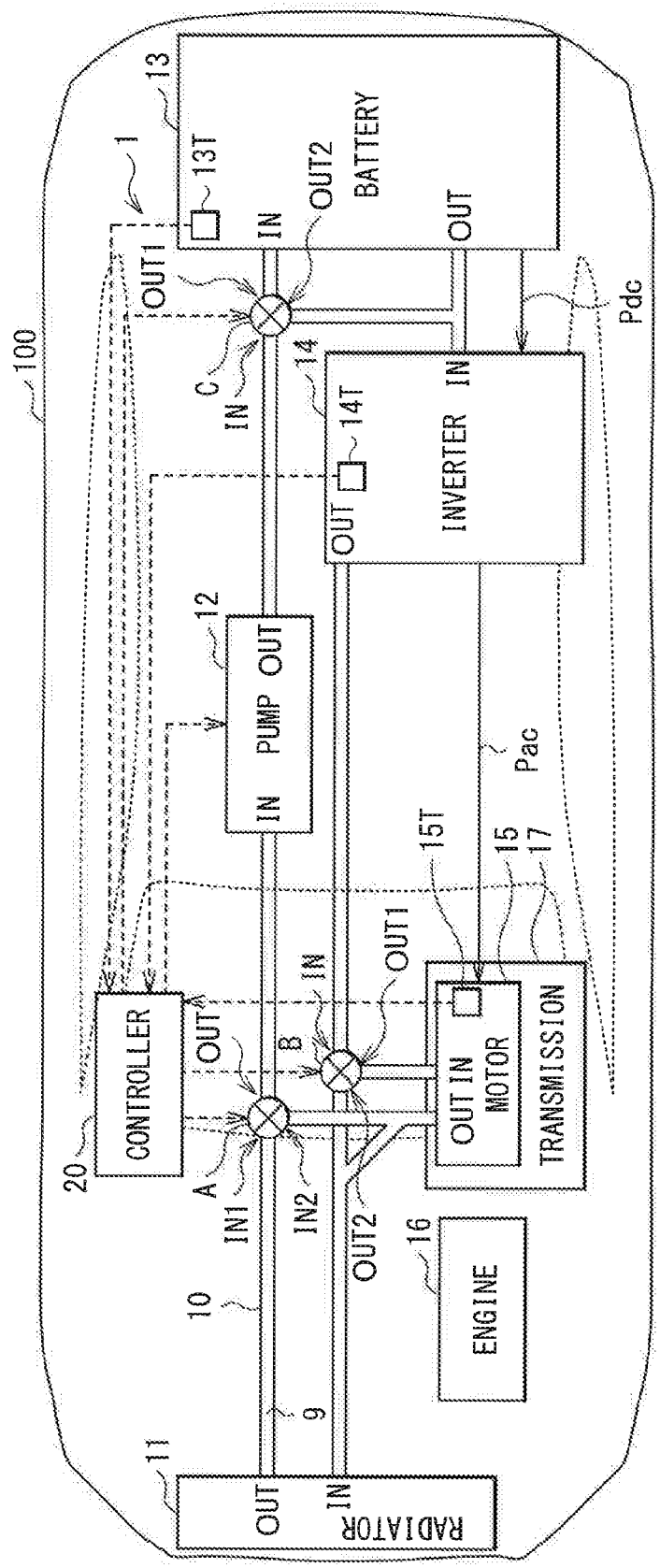
FIG. 1 is an explanatory diagram illustrating one configuration example of a vehicle including a cooling system according to one example embodiment of the technology.

In the following, some example embodiments of the technology are described in detail, with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. It is to be noted that the description is made in the following order.
1. First Example Embodiment (an example where three switching valves are provided)
2. Second Example Embodiment (an example where two switching valves are provided)

A vehicle may run under an environment where weather and temperature, for example, variously change. Amounts of heat generation in a battery, an inverter, and a motor may also change in accordance with a travel state. It has been desired to allow a vehicle to have a simple configuration to appropriately cool down a battery, an inverter, and a motor in accordance with an environment and a travel state.

It is desirable to provide a cooling system that makes it possible to appropriately cool down a battery, an inverter, and a motor with a simple configuration.

1. First Example Embodiment

Configuration Example

FIG. 1 illustrates one configuration example of a cooling system according to a first example embodiment. Hereinafter, the cooling system is referred to as a cooling system 1. The cooling system 1 may be mounted on a vehicle 100. The vehicle 100 may be a hybrid electric vehicle. The vehicle 100 may be configured to use the single cooling system 1 to allow a battery, an inverter, and a motor to be cooled down.

As illustrated in FIG. 1, the vehicle 100 may include a circulation channel 10, a radiator 11, a pump 12, a battery 13, an inverter 14, a motor 15, an engine 16, a transmission 17, switching valves A, B, and C, and a controller 20. The circulation channel 10, the pump 12, the switching valves A, B, and C, and the controller 20 may constitute the cooling system 1.

The circulation channel 10 may be a channel that allows a cooling medium 9 to flow. In this example, the circulation channel 10 may be configured to allow the cooling medium 9 to circulate in order of the radiator 11, the pump 12, the battery 13, the inverter 14, the motor 15, and the radiator 11. In one example embodiment, the cooling medium 9 to be used may be water, for example. The circulation channel 10 may be provided with the switching valves A, B, and C. As will be described later, the circulation channel 10 may be configured to cause the switching valve A to allow the cooling medium to bypass the radiator 11. The circulation channel 10 may further be configured to cause the switching valve B to allow the cooling medium to bypass the motor 15. The circulation channel 10 may still further be configured to cause the switching valve C to allow the cooling medium to bypass the battery 13.

The radiator 11 may be disposed on a front-most portion of the vehicle 100. The radiator 11 may be configured to cool down the cooling medium 9 flowing in the circulation channel 10. The radiator 11 may have an inlet IN and an outlet OUT each coupled to the circulation channel 10. With the cooling medium 9 flowing inside the radiator 11 from the inlet IN to the outlet OUT, it is possible to exchange heat between external air and the cooling medium 9. It is thus possible to cool down the cooling medium 9.

The pump 12 may be a fluid machine configured to allow the cooling medium 9 to circulate in the circulation channel 10. The pump 12 may have an inlet IN and an outlet OUT each coupled to the circulation channel 10. The pump 12 may be configured to discharge, from the outlet OUT, the cooling medium 9 having flowed into the inlet IN. The pump 12 may be configured to operate on the basis of an instruction from the controller 20.

The battery 13 may be disposed on a rear portion of the vehicle 100, for example. The battery 13 may be configured to store electric power and to supply direct current power Pdc to the inverter 14. The battery 13 may have an inlet IN and an outlet OUT each coupled to the circulation channel 10. With the cooling medium 9 flowing inside the battery 13 from the inlet IN to the outlet OUT, it is possible to cool down or warm up the battery 13. The battery 13 may include a temperature sensor 13T. The temperature sensor 13T may be configured to detect a temperature of the battery 13. Hereinafter, the temperature of the battery 13 is referred to as a battery temperature Tb. The temperature sensor 13T may further be configured to supply information of the battery temperature Tb to the controller 20. The battery 13 may be configured to be cooled down by the cooling system 1. It is thus possible to allow the battery temperature Tb to lower below a heat-resisting temperature of the battery 13. In one example embodiment, the heat-resisting temperature of the battery 13 may be 45° C.

The inverter 14 may be configured to generate alternating current power Pac on the basis of the direct current power Pdc supplied from the battery 13, and to supply the generated alternating current power Pac to the motor 15. The inverter 14 may have an inlet IN and an outlet OUT each coupled to the circulation channel 10. With the cooling medium 9 flowing inside the inverter 14 from the inlet IN to the outlet OUT, it is possible to cool down the inverter 14. The inverter 14 may include a temperature sensor 14T. The temperature sensor 14T may be configured to detect a temperature of the inverter 14. Hereinafter, the temperature of the inverter 14 is referred to as an inverter temperature Tinv. The temperature sensor 14T may further be configured to supply information of the inverter temperature Tinv to the controller 20. The inverter 14 may be configured to be cooled down by the cooling system 1. It is thus possible to allow the inverter temperature Tinv to lower below a heat-resisting temperature of the inverter 14. In one example embodiment, the heat-resisting temperature of the inverter 14 may be 45° C.

The motor 15 may be a power source configured to generate mechanical energy on the basis of the alternating current power Pac supplied from the inverter 14. In one example embodiment, the mechanical energy may serve as a driving force. The motor 15 may be configured to supply the generated driving force to the transmission 17. In this example, the motor 15 may be disposed inside the transmission 17. In one example embodiment, the motor 15 may be disposed adjacent to the transmission 17. The motor 15 may have an inlet IN and an outlet OUT each coupled to the circulation channel 10. With the cooling medium 9 flowing inside the motor 15 from the inlet IN to the outlet OUT, it is possible to cool down the motor 15. The motor 15 may include a temperature sensor 15T. The temperature sensor 15T may be configured to detect a temperature of the motor 15. Hereinafter, the temperature of the motor 15 is referred to as a motor temperature Tm. The temperature sensor 15T may further be configured to supply information of the motor temperature Tm to the controller 20. The motor 15 may be configured to be cooled down by the cooling system 1. It is thus possible to allow the motor temperature Tm to lower below a heat-resisting temperature of the motor 15. In one example embodiment, the heat-resisting temperature of the motor 15 may be 200° C.

The engine 16 may be a power source configured to allow fuel to burn to generate mechanical energy. In one example embodiment, the fuel may be gasoline, for example. In one example embodiment, the mechanical energy may serve as a driving force. The engine 16 may be configured to supply the generated driving force to the transmission 17.

The transmission 17 may be configured to change, in torque and speed, the driving force transmitted from the motor 15 and the driving force transmitted from the engine 16, and to transmit the changed driving forces to drive wheels of the vehicle 100.

The switching valves A, B, and C may each be configured to switch a channel that allows the cooling medium 9 to flow in the circulation channel 10 on the basis of an instruction from the controller 20.

FIG. 2 illustrates one operation example of the switching valves A, B, and C. The switching valve A may be configured to allow the cooling medium to bypass the radiator 11 in the circulation channel 10 on the basis of an instruction from the controller 20. The switching valve A may have inlets IN1 and IN2 and an outlet OUT, as illustrated in FIG. 1. The inlet IN1 may be coupled to the outlet OUT of the radiator 11 via the circulation channel 10. The inlet IN2 may be coupled to the outlet OUT of the motor 15 via the circulation channel 10. The outlet OUT may be coupled to the inlet IN of the pump 12 via the circulation channel 10.

The switching valve A may be configured to cause either one of a channel from the inlet IN1 to the outlet OUT and a channel from the inlet IN2 to the outlet OUT to open on the basis of an instruction from the controller 20. In a case where the switching valve A has caused the channel from the inlet IN1 to the outlet OUT to open, the cooling medium 9 may flow via the radiator 11. Hereinafter, the state where the channel from the inlet IN1 to the outlet OUT is caused to open is referred to as a state S1 in FIG. 2. In a case where the switching valve A has caused the channel from the inlet IN2 to the outlet OUT to open, the cooling medium 9 may flow, but may bypass the radiator 11. Hereinafter, the state where the channel from the inlet IN2 to the outlet OUT is caused to open is referred to as a state S2 in FIG. 2.

The switching valve B may be configured to allow the cooling medium to bypass the motor 15 in the circulation channel 10 on the basis of an instruction from the controller 20. The switching valve B may have an inlet IN and outlets OUT1 and OUT2, as illustrated in FIG. 1. The inlet IN may be coupled to the outlet OUT of the inverter 14 via the circulation channel 10. The outlet OUT1 may be coupled to the inlet IN of the motor 15 via the circulation channel 10. The outlet OUT2 may be coupled to the inlet IN of the radiator 11 via the circulation channel 10. The switching valve B may be configured to cause either one of a channel from the inlet IN to the outlet OUT1 and a channel from the inlet IN to the outlet OUT2 to open on the basis of an instruction from the controller 20.

In a case where the switching valve B has caused the channel from the inlet IN to the outlet OUT1 to open, the cooling medium 9 may flow via the motor 15. Hereinafter, the state where the channel from the inlet IN to the outlet OUT1 is caused to open is also referred to as the state S1 in FIG. 2. In a case where the switching valve B has caused the channel from the inlet IN to the outlet OUT2 to open, the cooling medium 9 may flow, but may bypass the motor 15. Hereinafter, the state where the channel from the inlet IN to the outlet OUT2 is caused to open is also referred to as the state S2 in FIG. 2.

The switching valve C may be configured to allow the cooling medium to bypass the battery 13 in the circulation channel 10 on the basis of an instruction from the controller 20. The switching valve C may have an inlet IN and outlets OUT1 and OUT2, as illustrated in FIG. 1. The inlet IN may be coupled to the outlet OUT of the pump 12 via the circulation channel 10. The outlet OUT1 may be coupled to the inlet IN of the battery 13 via the circulation channel 10. The outlet OUT2 may be coupled to the inlet IN of the inverter 14 via the circulation channel 10. The switching valve C may be configured to cause either one of a channel from the inlet IN to the outlet OUT1 and a channel from the inlet IN to the outlet OUT2 to open on the basis of an instruction from the controller 20.

In a case where the switching valve C has caused the channel from the inlet IN to the outlet OUT1 to open, the cooling medium 9 may flow via the battery 13. Hereinafter, the state where the channel from the inlet IN to the outlet OUT1 is caused to open is also referred to as the state S1 in FIG. 2. In a case where the switching valve C has caused the channel from the inlet IN to the outlet OUT2 to open, the cooling medium 9 may flow, but may bypass the battery 13. Hereinafter, the state where the channel from the inlet IN to the outlet OUT2 is caused to open is also referred to as the state S2 in FIG. 2.

The controller 20 may include a plurality of electronic control units, or ECUs, for example. Non-limiting examples of the plurality of electronic control units may include, for example, an electronic control unit that controls whole operation of the vehicle 100, an electronic control unit that controls operation of the motor 15, an electronic control unit that controls operation of the engine 16, an electronic control unit that controls operation of the transmission 17, and an electronic control unit that controls operation of the battery 13. The controller 20 may control operation of the pump 12. The controller 20 may further control the switching valves A to C on the basis of the motor temperature Tm detected by the temperature sensor 15T of the motor 15, the inverter temperature Tinv detected by the temperature sensor 14T of the inverter 14, and the battery temperature Tb detected by the temperature sensor 13T of the battery 13.

Note that the switching valve A may serve as a "first switching valve" in one embodiment of the technology. The switching valve B may serve as a "second switching valve" in one embodiment of the technology. The switching valve C may serve as a "third switching valve" in one embodiment of the technology. The controller 20 may serve as a "controller" in one embodiment of the technology.

[Operation and Workings]

Next, operation and workings of the cooling system 1 according to the first example embodiment will now be described herein.

[Outline of Whole Operation]

Outline of whole operation of the cooling system 1 will now first be described with reference to FIG. 2. The pump 12 may allow the cooling medium 9 to circulate in the circulation channel 10. Along the circulation channel 10, for example, the cooling medium 9 may circulate in order of the radiator 11, the pump 12, the battery 13, the inverter 14, and the motor 15. The switching valve A may switch the channel on the basis of an instruction from the controller 20 to allow the cooling medium 9 to flow via the radiator 11 or to allow the cooling medium 9 to flow, but to bypass the radiator 11, in the circulation channel 10. The switching valve B may switch the channel on the basis of an instruction from the controller 20 to allow the cooling medium 9 to flow via the motor 15 or to allow the cooling medium 9 to flow, but to bypass the motor 15, in the circulation channel 10. The switching valve C may switch the channel on the basis of an instruction from the controller 20 to allow the cooling medium 9 to flow via the battery 13 or to allow the cooling medium 9 to flow, but to bypass the battery 13, in the circulation channel 10. The controller 20 may control operation of the pump 12. The controller 20 may further control the switching valves A to C on the basis of the motor temperature Tm detected by the temperature sensor 15T of the motor 15, the inverter temperature Tinv detected by the temperature sensor 14T of the inverter 14, and the battery temperature Tb detected by the temperature sensor 13T of the battery 13.

[Detailed Operation]

The controller 20 may control the switching valves A to C on the basis of the motor temperature Tm, the inverter temperature Tinv, and the battery temperature Tb. The control makes it possible to allow the cooling system 1 to operate in one of five operation modes M. Hereinafter, the five operation modes M are respectively referred to as operation modes M1 to M5. Operation of the cooling system 1 will now be described herein in detail.

FIG. 3 illustrates the five operation modes M1 to M5 in the cooling system 1. FIGS. 4A to 4E respectively illustrate operation states in the operation modes M1 to M5. In FIGS. 4A to 4E, hatched areas in the circulation channel 10 illustrate the channels in which the cooling medium 9 flows.

[Operation Mode M1]

In a case where the vehicle 100 starts traveling in a cold region, for example, the controller 20 may set the operation mode M to the operation mode M1. In the operation mode M1, the cooling system 1 may use the motor 15 as a heat source to warm up the battery 13.

The controller 20 may set the operation mode M to the operation mode M1 in a case where, as illustrated in FIG. 3, the motor temperature Tm is below a predetermined threshold temperature T1, the inverter temperature Tinv is below a predetermined threshold temperature T2, and the battery temperature Tb is below a predetermined threshold temperature T3. In this example, the predetermined threshold temperatures T1, T2, and T3 may respectively be 80° C., 40° C., and 40° C.

Figure 4A:
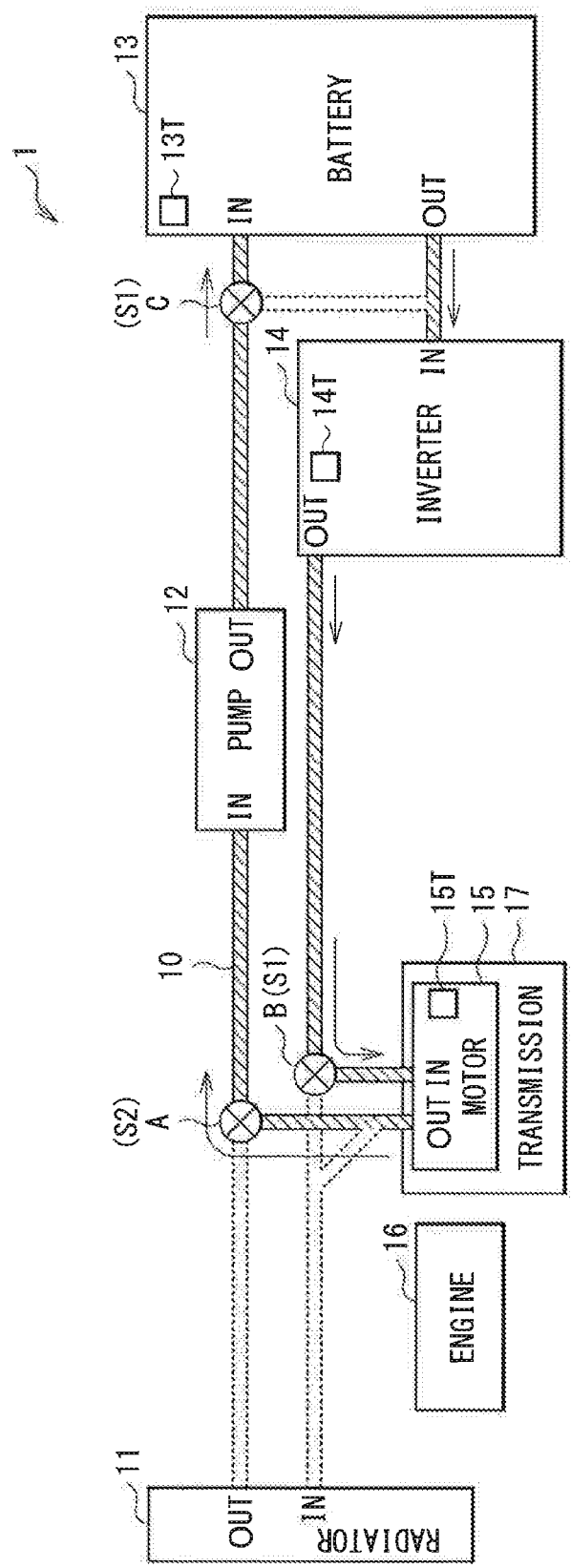
FIG. 4A is an explanatory diagram illustrating one operation example of the cooling system illustrated in FIG. 1.

In the operation mode M1, the controller 20 may cause, as illustrated in FIGS. 3 and 4A, the switching valve A to allow the cooling medium to bypass the radiator 11 to attain the state S2, the switching valve B to allow the cooling medium to flow via the motor 15 to attain the state S1, and the switching valve C to allow the cooling medium to flow via the battery 13 to attain the state S1. Under the states described above, the cooling medium 9 may circulate in order of the motor 15, the pump 12, the battery 13, the inverter 14, and the motor 15. As a result, it is possible in the cooling system 1 to use the motor 15 as a heat source to warm up the battery 13.

In other words, in a case where the vehicle 100 starts traveling in an environment at a lower external air temperature of −20° C., for example, fuel consumption may increase due to higher viscosity of lubricant in the motor 15 in a case where the motor temperature Tm is low. Output electric power of the battery 13 may lower as well in a case where the battery temperature Tb is low. In such a case, the controller 20 may set the operation mode M to the operation mode M1 to allow the cooling medium 9 to circulate in order of the motor 15, the pump 12, the battery 13, the inverter 14, and the motor 15. Upon start of operation, the engine 16 may generate heat. The heat generated in the engine 16 may be transmitted to the motor 15 and the transmission 17. In a case where, for example, such a heat exchanger is mounted that may exchange heat between cooling water in the engine 16 and cooling oil in the transmission 17, heat generated in the engine 16 may effectively be transmitted to the transmission 17. The heat may further be transmitted to the motor 15 provided inside the transmission 17. Upon start of operation, the motor 15 may generate heat.

As a result, the motor temperature Tm may rise. As the cooling medium 9 flows into the motor 15, the cooling medium 9 may be warmed up. As the cooling medium 9 warmed up by the motor 15 flows into the battery 13, the cooling medium 9 may warm up the battery 13. As described above, it is possible in the cooling system 1 in the operation mode M1 to use the motor 15 as a heat source to warm up the battery 13.

[Operation Mode M2]

In a case where, in the cooling system 1 operating in the operation mode M1, the battery 13 is fully warmed up in a state where the motor 15 is not yet fully heated, for example, the controller 20 may set the operation mode M to the operation mode M2. In the operation mode M2, the cooling system 1 may use the motor 15 as a heat source to warm up the transmission 17. The cooling system 1 may as well use the radiator 11 to cool down the battery 13 and the inverter 14.

The controller 20 may set the operation mode M to the operation mode M2 in a case where, as illustrated in FIG. 3, the motor temperature Tm is below the threshold temperature T1 and the battery temperature Tb is equal to or above the threshold temperature T3. In this example, the threshold temperatures T1 and T3 may respectively be 80° C. and 40° C.

Figure 4B:
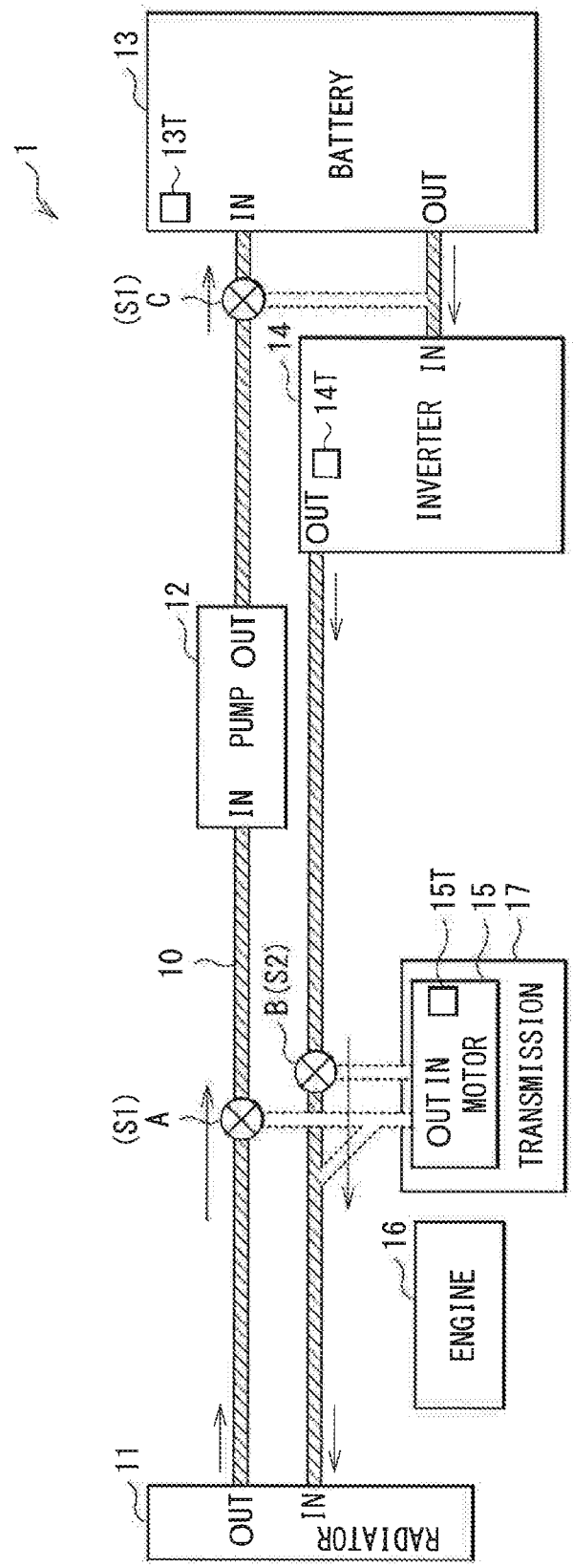
FIG. 4B is an explanatory diagram illustrating another operation example of the cooling system illustrated in FIG. 1.

In the operation mode M2, the controller 20 may cause, as illustrated in FIGS. 3 and 4B, the switching valve A to allow the cooling medium to flow via the radiator 11 to attain the state S1, the switching valve B to allow the cooling medium to bypass the motor 15 to attain the state S2, and the switching valve C to allow the cooling medium to flow via the battery 13 to attain the state S1. Under the states described above, the cooling medium 9 may circulate in order of the radiator 11, the pump 12, the battery 13, the inverter 14, and the radiator 11. As a result, it is possible in the cooling system 1 to use the motor 15 as a heat source to warm up the transmission 17. It is further possible to use the radiator 11 to cool down the battery 13 and the inverter 14.

In other words, in a case where the motor temperature Tm is below the threshold temperature T1 and the motor 15 is not yet fully heated, fuel consumption would be likely to increase due to the higher viscosity of the lubricant in the motor 15. In one example embodiment, the threshold temperature T1 may be 80° C. Fuel consumption would be likely to increase due to higher viscosity of lubricant in the transmission 17 as well. In a case where the battery temperature Tb is equal to or above the threshold temperature T3 and the battery 13 is fully warmed up, it is possible to suppress lowering of output electric power of the battery 13. In one example embodiment, the threshold temperature T3 may be 40° C. As the battery 13 and the inverter 14 operate, the battery 13 and the inverter 14 may generate heat. The battery temperature Tb and the inverter temperature Tinv may thus respectively further rise. With the operation mode M set to the operation mode M2, the controller 20 may allow the cooling medium 9 to circulate in order of the radiator 11, the pump 12, the battery 13, the inverter 14, and the radiator 11. As the cooling medium 9 flows into the radiator 11, the cooling medium 9 may be cooled down. As the cooling medium 9 cooled down by the radiator 11 flows into the battery 13 and the inverter 14, it is possible to cool down the battery 13 and the inverter 14. The cooling medium 9 however does not flow into the motor 15. With heat generated in the motor 15 and transmitted to the transmission 17, it is possible to warm up the transmission 17. As described above, it is possible in the cooling system 1 in the operation mode M2 to use the motor 15 as a heat source to warm up the transmission 17. It is further possible to use the radiator 11 to selectively cool down the battery 13 and the inverter 14.

[Operation Mode M3]

In a case where, in the cooling system 1 operating in the operation mode M2, the motor 15 is fully heated, for example, the controller 20 may set the operation mode M to the operation mode M3. In the operation mode M3, the cooling system 1 may use the radiator 11 to cool down the battery 13, the inverter 14, and the motor 15.

The controller 20 may set the operation mode M to the operation mode M3 in a case where, as illustrated in FIG. 3, the motor temperature Tm is equal to or above the threshold temperature T1 and the battery temperature Tb is equal to or above the threshold temperature T3. In this example, the threshold temperatures T1 and T3 may respectively be 80° C. and 40° C.

Figure 4C:
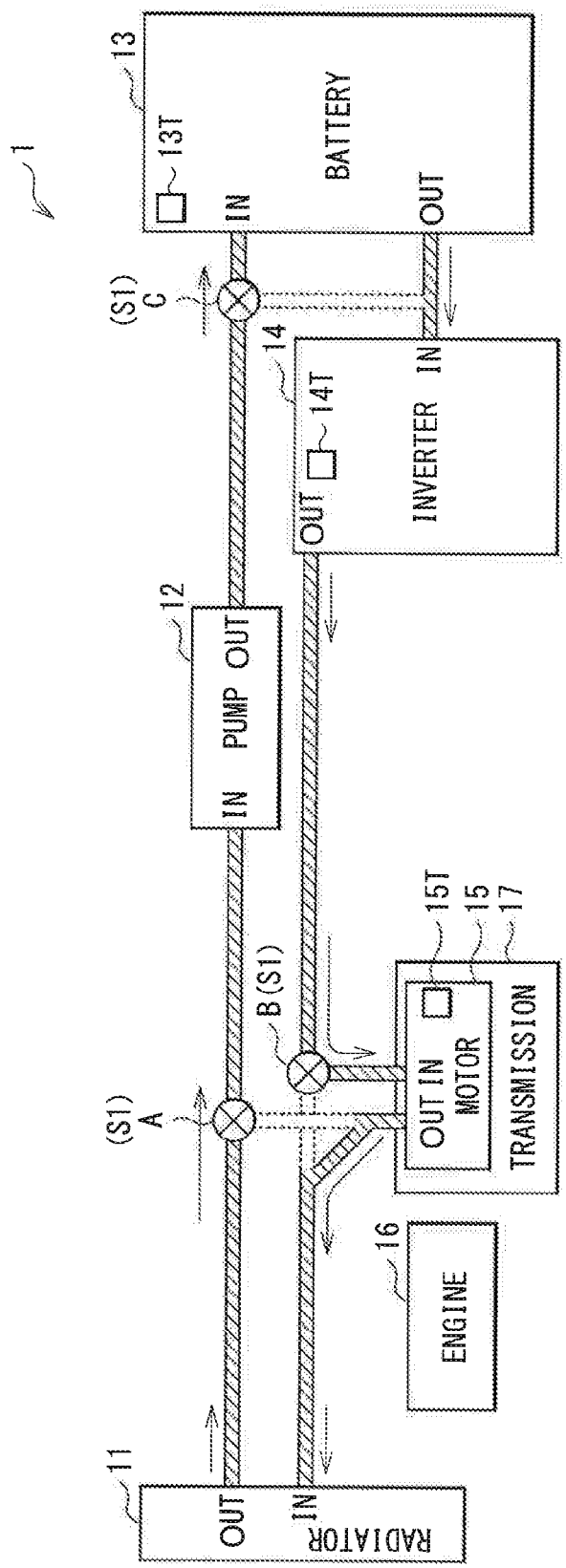
FIG. 4C is an explanatory diagram illustrating still another operation example of the cooling system illustrated in FIG. 1.

In the operation mode M3, the controller 20 may cause, as illustrated in FIGS. 3 and 4C, the switching valve A to allow the cooling medium to flow via the radiator 11 to attain the state S1, the switching valve B to allow the cooling medium to flow via the motor 15 to attain the state S1, and the switching valve C to allow the cooling medium to flow via the battery 13 to attain the state S1. Under the states described above, the cooling medium 9 may circulate in order of the radiator 11, the pump 12, the battery 13, the inverter 14, the motor 15, and the radiator 11. As a result, it is possible in the cooling system 1 to use the radiator 11 to cool down the battery 13, the inverter 14, and the motor 15.

In other words, in a case where the motor temperature Tm is equal to or above the threshold temperature T1 and the motor 15 is fully heated, the lower viscosity of the lubricant makes it possible to prevent fuel consumption from increasing. In one example embodiment, the threshold temperature T1 may be 80° C. With the transmission 17 fully heated, the lower viscosity of the lubricant similarly makes it possible to further prevent fuel consumption from increasing. In a case where the battery temperature Tb is equal to or above the threshold temperature T3 and the battery 13 is fully warmed up, it is possible to suppress lowering of output electric power of the battery 13. In one example embodiment, the threshold temperature T3 may be 40° C. As the battery 13, the inverter 14, and the motor 15 operate, the battery 13, the inverter 14, and the motor 15 may generate heat. The battery temperature Tb, the inverter temperature Tinv, and the motor temperature Tm may thus respectively further rise. With the operation mode M set to the operation mode M3, the controller 20 may allow the cooling medium 9 to circulate in order of the radiator 11, the pump 12, the battery 13, the inverter 14, the motor 15, and the radiator 11. As the cooling medium 9 flows into the radiator 11, the cooling medium 9 may be cooled down. As the cooling medium 9 cooled down by the radiator 11 flows into the battery 13, the inverter 14, and the motor 15, it is possible to cool down the battery 13, the inverter 14, and the motor 15. As described above, it is possible in the cooling system 1 in the operation mode M3 to use the radiator 11 to cool down the battery 13, the inverter 14, and the motor 15.

[Operation Mode M4]

In a case where, in the cooling system 1 operating in the operation mode M1, the motor 15 is fully heated in a state where the battery 13 is not yet fully warmed up, for example, the controller 20 may set the operation mode M to the operation mode M4. In the operation mode M4, the cooling system 1 may use the radiator 11 to cool down the inverter 14 and the motor 15.

The controller 20 may set the operation mode M to the operation mode M4 in a case where, as illustrated in FIG. 3, the motor temperature Tm is equal to or above the threshold temperature T1 and the battery temperature Tb is below the threshold temperature T3. In this example, the threshold temperatures T1 and T3 may respectively be 80° C. and 40° C.

Figure 4D:
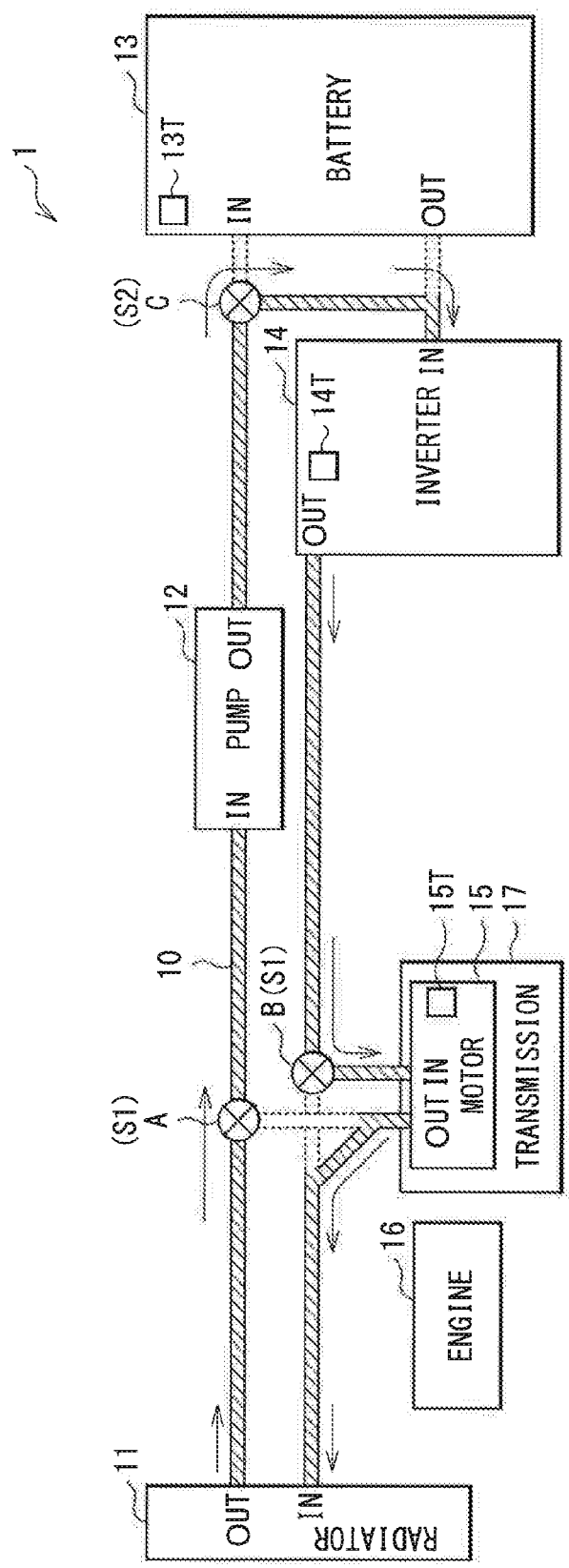
FIG. 4D is an explanatory diagram illustrating still another operation example of the cooling system illustrated in FIG. 1.

In the operation mode M4, the controller 20 may cause, as illustrated in FIGS. 3 and 4D, the switching valve A to allow the cooling medium to flow via the radiator 11 to attain the state S1, the switching valve B to allow the cooling medium to flow via the motor 15 to attain the state S1, and the switching valve C to allow the cooling medium to bypass the battery 13 to attain the state S2. Under the states described above, the cooling medium 9 may circulate in order of the radiator 11, the pump 12, the inverter 14, the motor 15, and the radiator 11. As a result, the cooling system 1 may use the radiator 11 to cool down the inverter 14 and the motor 15.

In other words, in a case where the battery temperature Tb is below the threshold temperature T3 and the battery 13 is not yet fully warmed up, output electric power of the battery 13 may lower. In one example embodiment, the threshold temperature T3 may be 40° C. In a case where the motor temperature Tm is equal to or above the threshold temperature T1 and the motor 15 is fully heated, however, the lower viscosity of the lubricant makes it possible to prevent fuel consumption from increasing. In one example embodiment, the threshold temperature T1 may be 80° C. As the inverter 14 and the motor 15 operate, the inverter 14 and the motor 15 may generate heat. The inverter temperature Tinv and the motor temperature Tm may thus respectively further rise. With the operation mode M set to the operation mode M4, the controller 20 may allow the cooling medium 9 to circulate in order of the radiator 11, the pump 12, the inverter 14, the motor 15, and the radiator 11. As the cooling medium 9 flows into the radiator 11, the cooling medium 9 may be cooled down. As the cooling medium 9 cooled down by the radiator 11 flows into the inverter 14 and the motor 15, it is possible to cool down the inverter 14 and the motor 15. The cooling medium 9 however does not flow into the battery 13. As the battery 13 operates, the battery 13 may generate heat, making it possible to allow the battery temperature Tb to rise. As described above, it is possible in the cooling system 1 in the operation mode M4 to use the radiator 11 to selectively cool down the inverter 14 and the motor 15.

[Operation Mode M5]

In a case where, in the cooling system 1 operating in the operation mode M1, the inverter 14 is fully heated in a state where the battery 13 is not yet fully warmed up and the motor 15 is as well not yet fully heated, for example, the controller 20 may set the operation mode M to the operation mode M5. In the operation mode M5, the cooling system 1 may use the radiator 11 to cool down the inverter 14.

The controller 20 may set the operation mode M to the operation mode M5 in a case where, as illustrated in FIG. 3, the motor temperature Tm is below the threshold temperature T1, the inverter temperature Tinv is equal to or above the threshold temperature T2, and the battery temperature Tb is below the threshold temperature T3. In this example, the threshold temperatures T1, T2, and T3 may respectively be 80° C., 40° C., and 40° C.

Figure 4E:
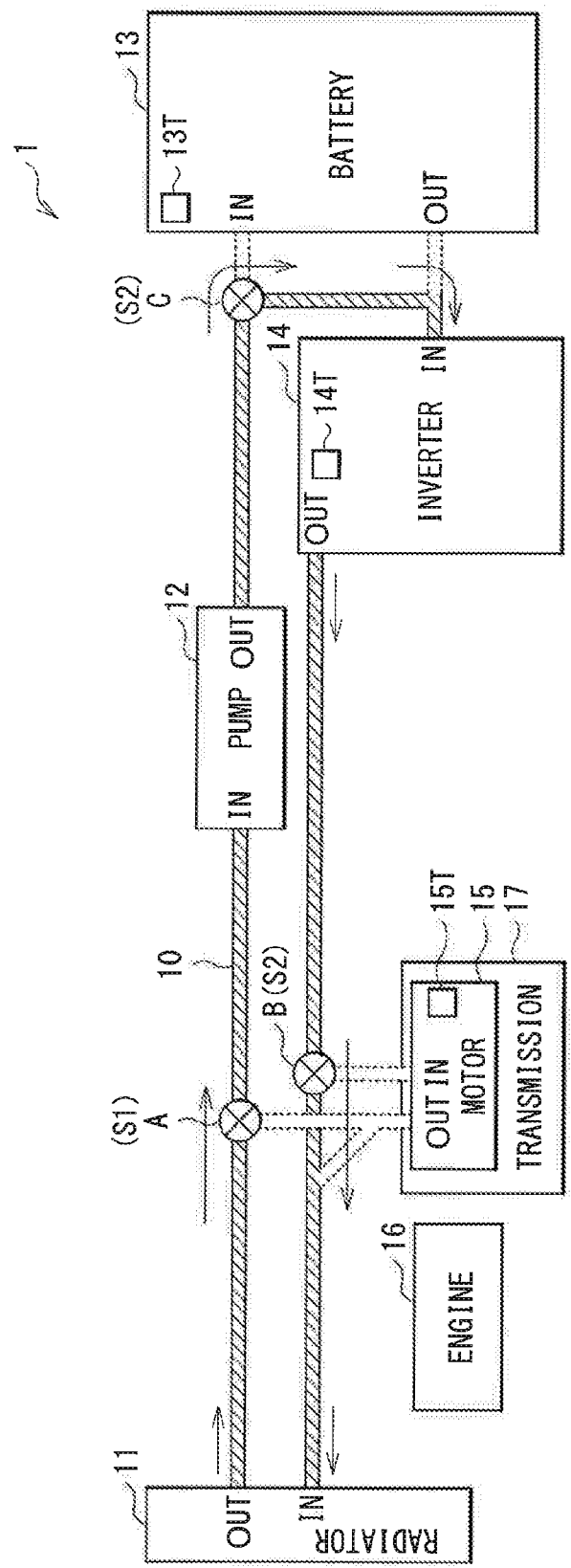
FIG. 4E is an explanatory diagram illustrating still another operation example of the cooling system illustrated in FIG. 1.

In the operation mode M5, the controller 20 may cause, as illustrated in FIGS. 3 and 4E, the switching valve A to allow the cooling medium to flow via the radiator 11 to attain the state S1, the switching valve B to allow the cooling medium to bypass the motor 15 to attain the state S2, and the switching valve C to allow the cooling medium to bypass the battery 13 to attain the state S2. Under the states described above, the cooling medium 9 may circulate in order of the radiator 11, the pump 12, the inverter 14, and the radiator 11. As a result, the cooling system 1 may use the radiator 11 to cool down the inverter 14.

In other words, in a case where the battery temperature Tb is below the threshold temperature T3 and the battery 13 is not yet fully warmed up, output electric power of the battery 13 may lower. In one example embodiment, the threshold temperature T3 may be 40° C. In a case where the motor temperature Tm is below the threshold temperature T1 and the motor 15 is not yet fully heated, fuel consumption would be likely to increase due to the higher viscosity of the lubricant in the motor 15. In one example embodiment, the threshold temperature T1 may be 80° C. Meanwhile, the inverter temperature Tinv may be equal to or above the threshold temperature T2. As the inverter 14 operates, the inverter 14 may generate heat. The inverter temperature Tinv may thus further rise. In one example embodiment, the threshold temperature T2 may be 40° C. With the operation mode M set to the operation mode M5, the controller 20 may allow the cooling medium 9 to circulate in order of the radiator 11, the pump 12, the inverter 14, and the radiator 11. As the cooling medium 9 flows into the radiator 11, the cooling medium 9 may be cooled down. As the cooling medium 9 cooled down by the radiator 11 flows into the inverter 14, it is possible to cool down the inverter 14. The cooling medium 9 however does not flow into the battery 13 and the motor 15. As the battery 13 and the motor 15 operate, the battery 13 and the motor 15 may generate heat, making it possible to allow the battery temperature Tb and the motor temperature Tm to rise. As described above, it is possible in the cooling system 1 in the operation mode M5 to use the radiator 11 to selectively cool down the inverter 14.

Note that the operation mode M1 may serve as a "first mode" in one embodiment of the technology. The operation mode M2 may serve as a "second mode" in one embodiment of the technology. The operation mode M3 may serve as a "third mode" in one embodiment of the technology. The operation mode M4 may serve as a "fourth mode" in one embodiment of the technology. The operation mode M5 may serve as a "fifth mode" in one embodiment of the technology.

[Operation of Switching Valves A to C]

The switching valves A to C may be controlled by the controller 20 on the basis of the motor temperature Tm, the inverter temperature Tinv, and the battery temperature Tb.

In a specific but non-limiting example, the controller 20 may cause the switching valve A to allow the cooling medium to bypass the radiator 11 to attain the state S2 in a case where, as illustrated in FIG. 3, the motor temperature Tm is below the threshold temperature T1, the inverter temperature Tinv is below the threshold temperature T2, and the battery temperature Tb is below the threshold temperature T3. In this example, the threshold temperatures T1, T2, and T3 may respectively be 80° C., 40° C., and 40° C.

The controller 20 may further cause, as illustrated in FIG. 3, the switching valve B to allow the cooling medium to flow via the motor 15 to attain the state S1 in a case where at least one of a first condition or a second condition described below is satisfied. The first condition may denote that the motor temperature Tm is equal to or above the threshold temperature T1. In this example, the threshold temperature T1 may be 80° C. The second condition may denote that the inverter temperature Tinv is below the threshold temperature T2 and the battery temperature Tb is below the threshold temperature T3. In this example, the threshold temperatures T2 and T3 may respectively be 40° C. and 40° C.

The controller 20 may further cause, as illustrated in FIG. 3, the switching valve C to allow the cooling medium to flow via the battery 13 to attain the state S1 in a case where either one of a first condition and a second condition described below is satisfied.

The first condition may denote that the motor temperature Tm is below the threshold temperature T1, the inverter temperature Tinv is below the threshold temperature T2, and the battery temperature Tb is below the threshold temperature T3. In this example, the threshold temperatures T1, T2, and T3 may respectively be 80° C., 40° C., and 40° C. The second condition may denote that the battery temperature Tb is equal to or above the threshold temperature T3. In this example, the threshold temperature T3 may be 40° C.

As described above, the switching valves A to C may be controlled by the controller 20 on the basis of the motor temperature Tm, the inverter temperature Tinv, and the battery temperature Tb. The cooling system 1 may thus operate in one of the five operation modes M1 to M5 described above.

[Transition of Operation Mode M]

Figure 5:
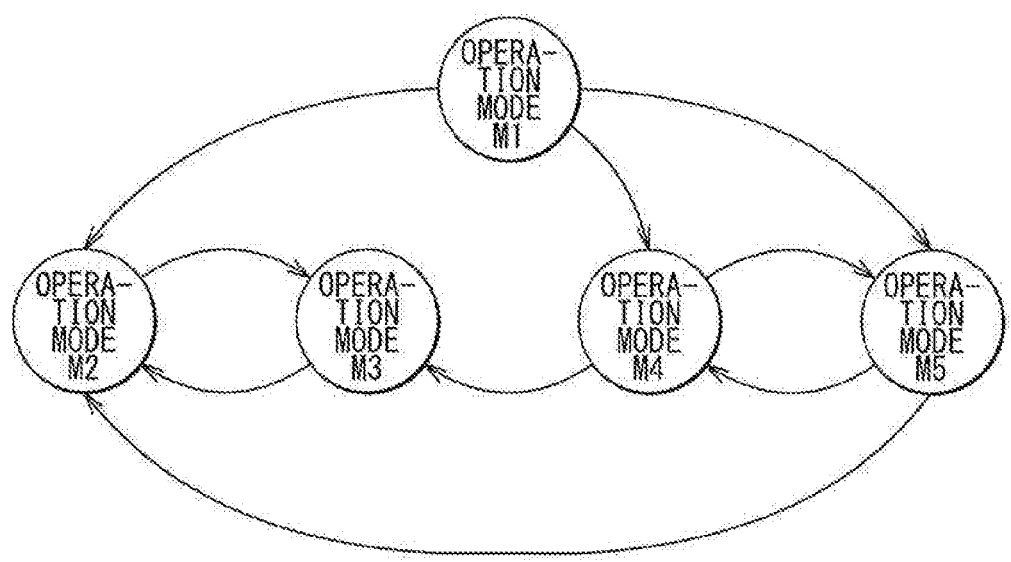
FIG. 5 is a state transition diagram illustrating transition of an operation mode in the cooling system illustrated in FIG. 1.

FIG. 5 illustrates transition of the operation mode M in the cooling system 1. In a case where the vehicle 100 starts traveling in a cold region, for example, the controller 20 may set the operation mode M to the operation mode M1.

In a case where, in the cooling system 1 operating in the operation mode M1, the battery 13 is fully warmed up in a state where the motor 15 is not yet fully heated, for example, the operation mode M may transition from the operation mode M1 to the operation mode M2. In a case where, in the cooling system 1 operating in the operation mode M2, the motor 15 is fully heated, for example, the operation mode M may transition from the operation mode M2 to the operation mode M3. In a case where, in the cooling system 1 operating in the operation mode M3, the motor 15 is fully cooled down, for example, the operation mode M may transition from the operation mode M3 to the operation mode M2.

In a case where, in the cooling system 1 operating in the operation mode M1, the motor 15 is fully heated in a state where the battery 13 is not yet fully warmed up, for example, the operation mode M may transition from the operation mode M1 to the operation mode M4. In a case where, in the cooling system 1 operating in the operation mode M4, the motor 15 is fully cooled down, for example, the operation mode M may transition from the operation mode M4 to the operation mode M5. In a case where, in the cooling system 1 operating in the operation mode M5, the motor 15 is fully heated, for example, the operation mode M may transition from the operation mode M5 to the operation mode M4.

In a case where, in the cooling system 1 operating in the operation mode M1, the inverter 14 is fully heated in a state where the battery 13 is not yet fully warmed up and the motor 15 is as well not yet fully heated, for example, the operation mode M may transition from the operation mode M1 to the operation mode M5.

In a case where, in the cooling system 1 operating in the operation mode M4, the battery 13 is fully warmed up, for example, the operation mode M may transition from the operation mode M4 to the operation mode M3.

In a case where, in the cooling system 1 operating in the operation mode M5, the battery 13 is fully warmed up, for example, the operation mode M may transition from the operation mode M5 to the operation mode M2.

As described above, the cooling system 1 may be configured to use the single circulation channel 10 to allow the battery 13, the inverter 14, and the motor 15 to be cooled down. The arrangement makes it possible to simplify the cooling system 1 in configuration, compared with a case of separately preparing a system that cools down the battery 13, a system that cools down the inverter 14, and a system that cools down the motor 15, for example.

In the cooling system 1 where, in the circulation channel 10, the cooling medium 9 is allowed to circulate in order of the radiator 11, the pump 12, the battery 13, the inverter 14, the motor 15, and the radiator 11, it is possible to effectively cool down the battery 13, the inverter 14, and the motor 15. In the cooling system 1, for example, the motor 15 having the highest heat-resisting temperature may be disposed downstream of the battery 13 and the inverter 14 in the circuit channel starting from the radiator 11. In this arrangement, the cooling medium 9 cooled down by the radiator 11 may be supplied promptly to the battery 13 and the inverter 14 in a case where the battery 13, the inverter 14, and the motor 15 are to be cooled down together, as illustrated in FIG. 4C, for example. This makes it possible to effectively cool down the battery 13 and the inverter 14. In the cooling system 1, the inverter 14 having the higher heat-resisting temperature than the heat-resisting temperature of the battery 13 may be disposed downstream of the battery 13. In this arrangement, the cooling medium 9 cooled down by the radiator 11 may be similarly supplied to the battery 13 promptly before the cooling medium 9 is supplied to the inverter 14, making it possible to effectively cool down the battery 13 in a case where the battery 13 and the inverter 14 are to be cooled down, as illustrated in FIG. 4B, for example.

In the cooling system 1, the three switching valves A to C may be provided in the circulation channel 10. This makes it possible to use the switching valves A to C to set one of a plurality of operation modes M. In this example, the plurality of operation modes M are referred to as the operation modes M1 to M5. It is thus possible to appropriately cool down the battery, the inverter, and the motor in accordance with an environment and a travel state. In a specific but non-limiting example, it is possible in the operation mode M1 illustrated in FIG. 4A to use the motor 15 as a heat source to warm up the battery 13 in a case where the vehicle 100 starts traveling in a cold region, for example. It is possible in the operation mode M2 illustrated in FIG. 4B to select and cool down the battery 13 and the inverter 14, for example. It is possible in the operation mode M3 illustrated in FIG. 4C to cool down the battery 13, the inverter 14, and the motor 15, for example. It is possible in the operation mode M4 illustrated in FIG. 4D to select and cool down the inverter 14 and the motor 15, for example. It is possible in the operation mode M5 illustrated in FIG. 4E to select and cool down the inverter 14, for example.

Example Effects

As described above, the first example embodiment may be configured to use the single circulation channel to allow the battery, the inverter, and the motor to be cooled down, making it possible to simplify the cooling system in configuration.

In the first example embodiment where, in the circulation channel, the cooling medium is allowed to circulate in order of the radiator, the pump, the battery, the inverter, the motor, and the radiator, it is possible to effectively cool down the battery, the inverter, and the motor.

In the first example embodiment, the three switching valves may be provided in the circulation channel. It is thus possible to appropriately cool down the battery, the inverter, and the motor in accordance with an environment and a travel state.

Modification Example

In the example embodiment described above, the switching valves A, B, and C may be provided at positions illustrated in FIG. 1. However, the positions at which the switching valves A, B, and C are provided are not limited to the positions illustrated in FIG. 1. For example, the switching valve A may be provided at any position allowing the cooling medium to bypass the radiator 11. The switching valve B may be provided at any position allowing the cooling medium to bypass the motor 15. The switching valve C may be provided at any position allowing the cooling medium to bypass the battery 13. A modification example will now be described in detail with reference to the switching valve C as an example.

Figure 6:
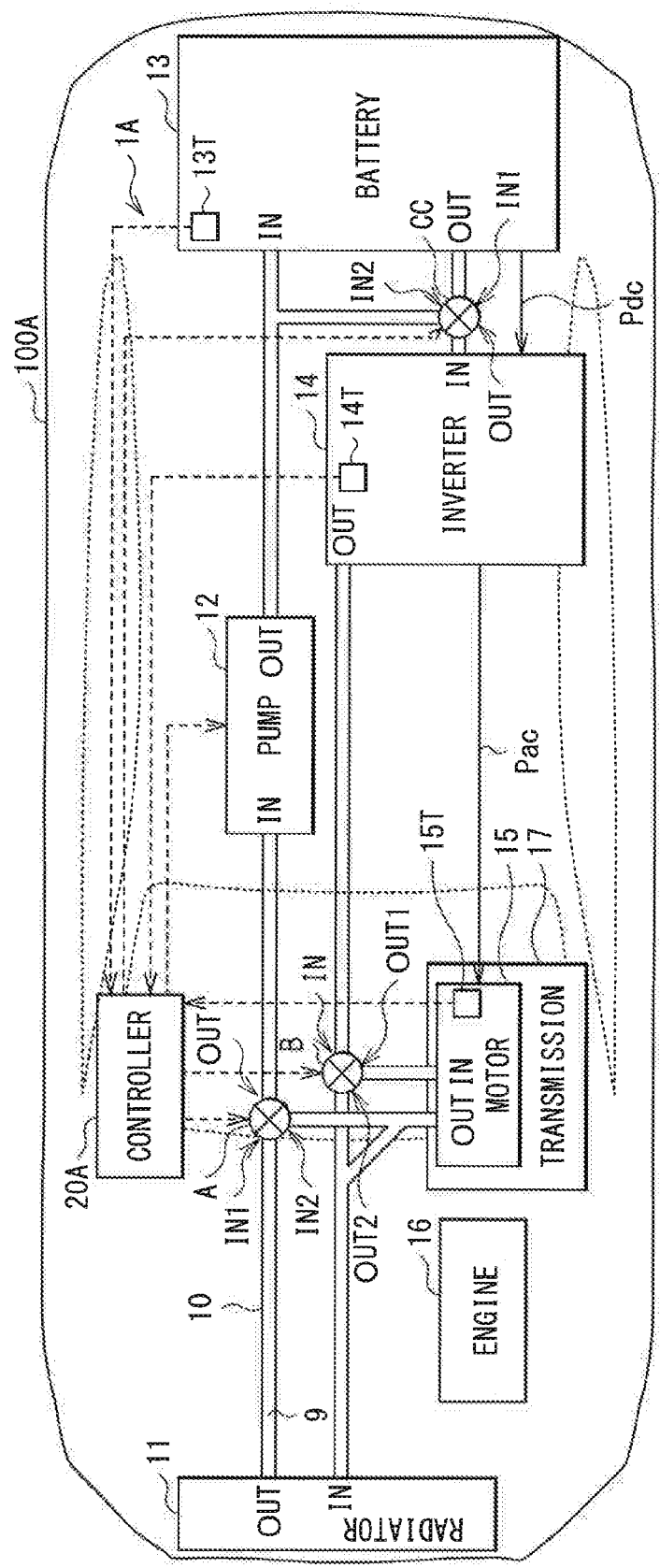
FIG. 6 is an explanatory diagram illustrating one configuration example of a vehicle including a cooling system according to a modification example of one example embodiment.

FIG. 6 illustrates one configuration example of a vehicle 100A according to the modification example. The vehicle 100A may include a switching valve CC and a controller 20A. The circulation channel 10, the pump 12, the switching valves A, B, and CC, and the controller 20A may constitute a cooling system 1A. FIG. 7 illustrates one operation example of the switching valves A, B, and CC. The switching valve CC may be configured to allow the cooling medium to bypass the battery 13 in the circulation channel 10 on the basis of an instruction from the controller 20A. The switching valve CC may have inlets IN1 and IN2 and an outlet OUT. The inlet IN1 may be coupled to the outlet OUT of the battery 13 via the circulation channel 10. The inlet IN2 may be coupled to the outlet OUT of the pump 12 via the circulation channel 10. The outlet OUT may be coupled to the inlet IN of the inverter 14 via the circulation channel 10. As illustrated in FIG. 7, the switching valve CC may be configured to cause either one of a channel from the inlet IN1 to the outlet OUT and a channel from the inlet IN2 to the outlet OUT to open on the basis of an instruction from the controller 20A. In a case where the switching valve CC has caused the channel from the inlet IN1 to the outlet OUT to open, the cooling medium 9 may flow via the battery 13. Hereinafter, this state is referred to as a state S1. In a case where the switching valve CC has caused the channel from the inlet IN2 to the outlet OUT to open, the cooling medium 9 may flow, but may bypass the battery 13. Hereinafter, this state is referred to as a state S2. The controller 20A may control the switching valves A, B, and CC on the basis of the motor temperature Tm, the inverter temperature Tinv, and the battery temperature Tb.

2. Second Example Embodiment

Next, a cooling system 2 according to a second example embodiment will now be described herein. In the second example embodiment, the two switching valves A and B may be provided in the circulation channel 10. It is to be noted that like reference numerals designate, throughout the drawings, components substantially identical or corresponding to the components of the cooling system 1 according to the first example embodiment described above. Some descriptions are thus appropriately omitted.

Figure 8:
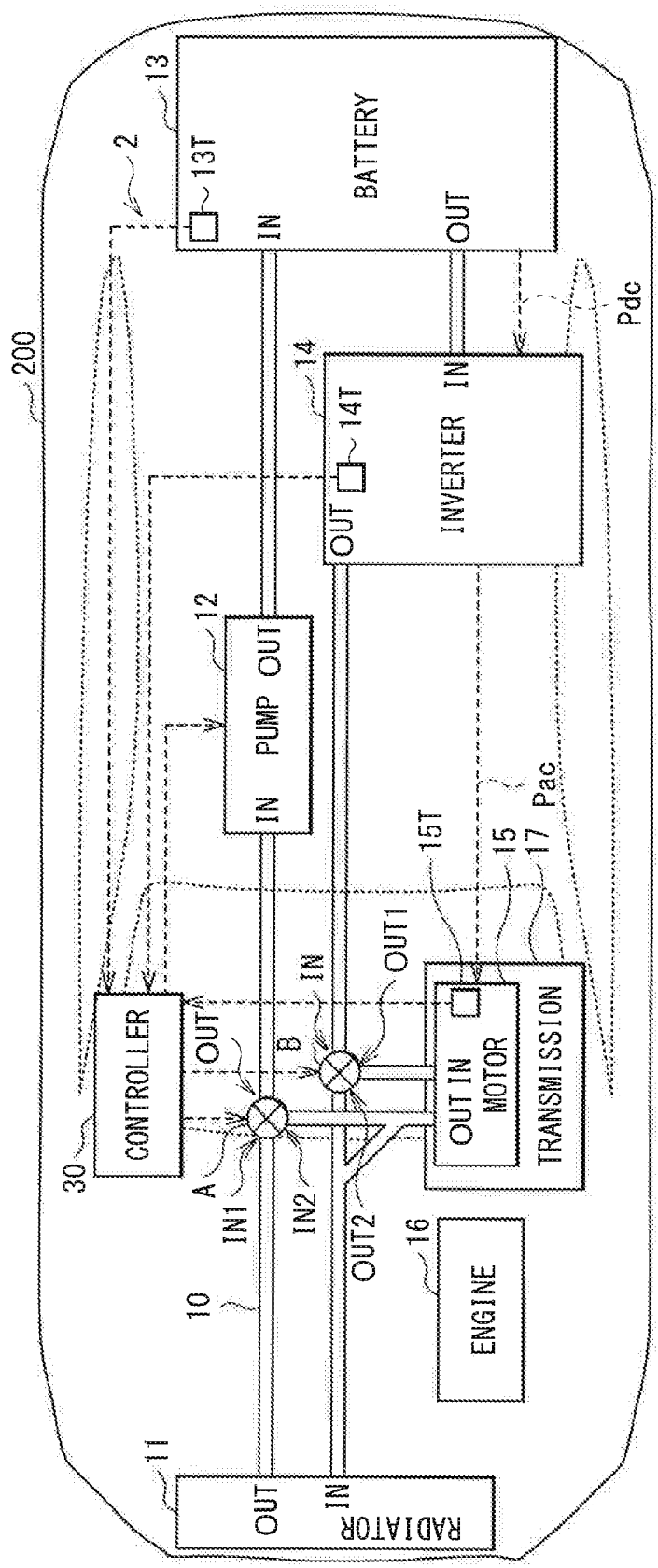
FIG. 8 is an explanatory diagram illustrating one configuration example of a vehicle including a cooling system according to one example embodiment.

FIG. 8 illustrates one configuration example of the cooling system 2 according to the second example embodiment. The cooling system 2 may be mounted on a vehicle 200. The vehicle 200 may include the two switching valves A and B and a controller 30. In other words, the cooling system 1 according to the first example embodiment described above may be provided with the three switching valves A to C in the circulation channel 10. The switching valve C may be however omitted in the cooling system 2 according to the second example embodiment. The circulation channel 10, the pump 12, the switching valves A and B, and the controller 30 may constitute the cooling system 2.

The switching valve A may be configured to allow the cooling medium to bypass the radiator 11 in the circulation channel 10 on the basis of an instruction from the controller 30. The switching valve B may be configured to allow the cooling medium to bypass the motor 15 in the circulation channel 10 on the basis of an instruction from the controller 30. The switching valves A and B may respectively be similar in operation to the switching valves A and B according to the first example embodiment described above and illustrated in FIG. 2.

As with the controller 20 according to the first example embodiment described above, the controller 30 may control operation of the pump 12. The controller 30 may further control the switching valves A and B on the basis of the motor temperature Tm detected by the temperature sensor 15T of the motor 15, the inverter temperature Tinv detected by the temperature sensor 14T of the inverter 14, and the battery temperature Tb detected by the temperature sensor 13T of the battery 13.

With the controller 30 that controls the switching valves A and B on the basis of the motor temperature Tm, the inverter temperature Tinv, and the battery temperature Tb, it is possible to allow the cooling system 2 to operate in one of three operation modes M. Hereinafter, the three operation modes M are referred to as operation modes M11 to M13.

Figure 10A:
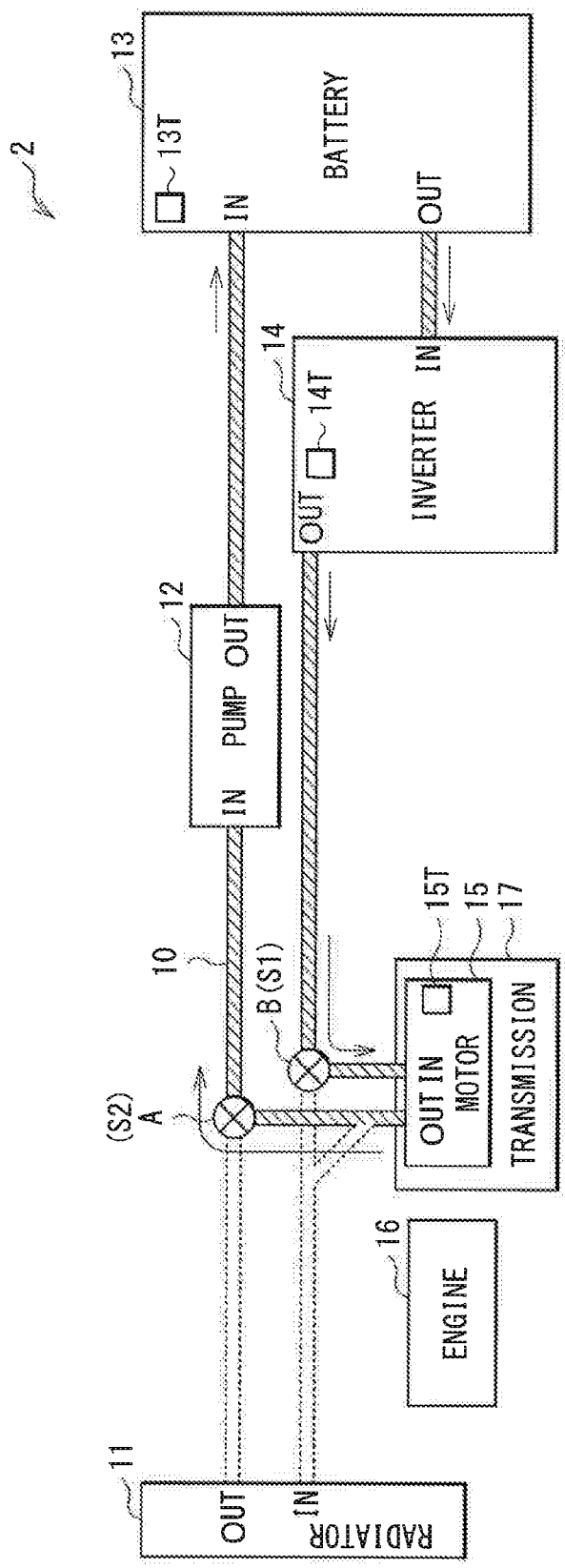
FIG. 10A is an explanatory diagram illustrating one operation example of the cooling system illustrated in FIG. 8.
Figure 10B:
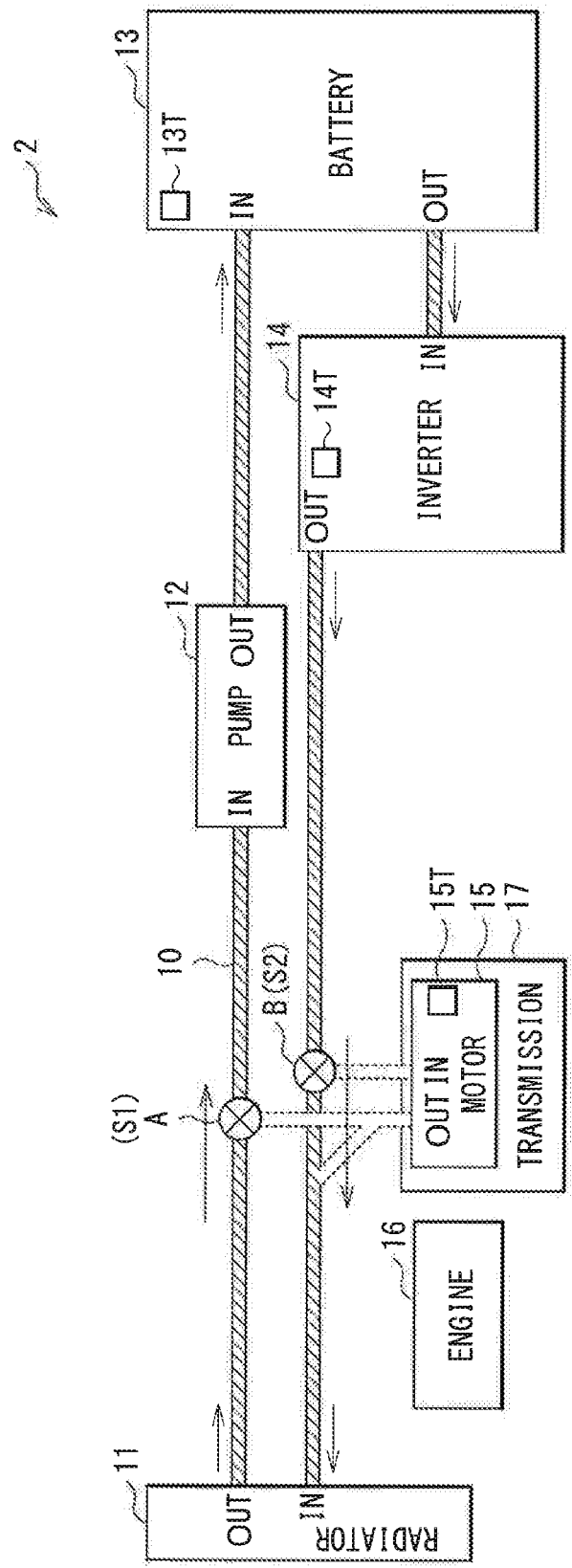
FIG. 10B is an explanatory diagram illustrating another operation example of the cooling system illustrated in FIG. 8.
Figure 10C:
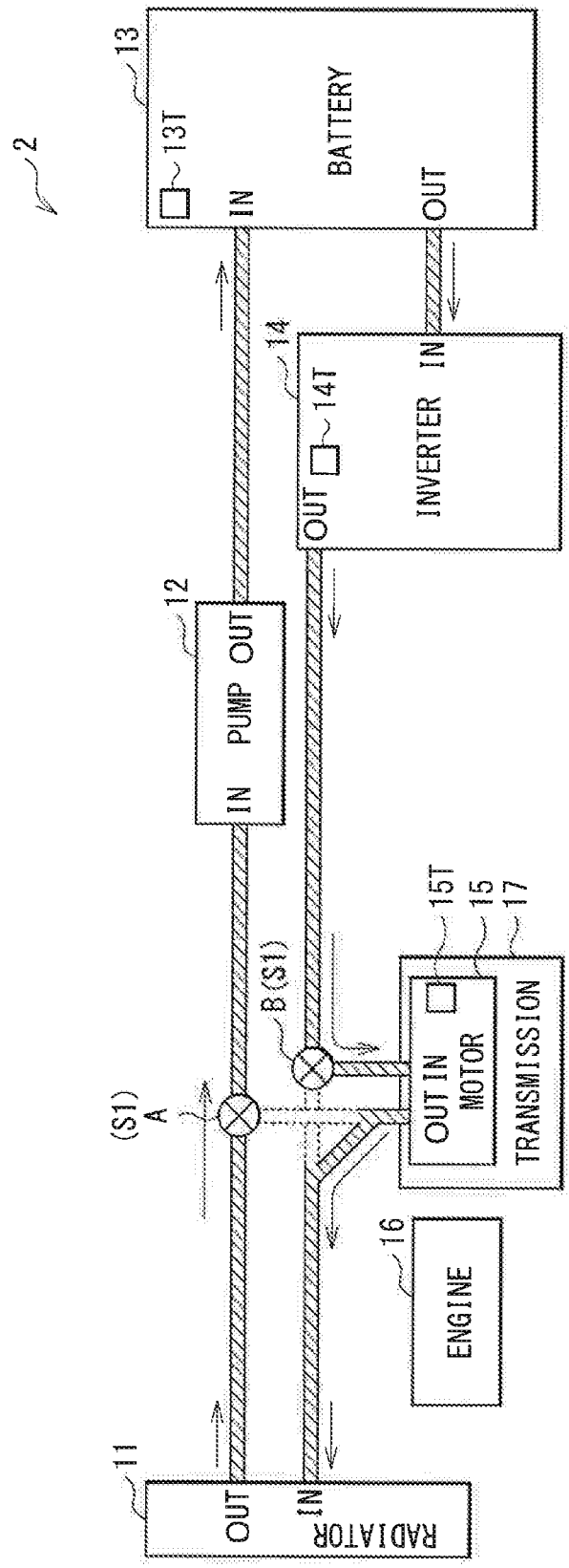
FIG. 10C is an explanatory diagram illustrating still another operation example of the cooling system illustrated in FIG. 8.

FIG. 9 illustrates the three operation modes M11 to M13 in the cooling system 2. FIGS. 10A to 10C respectively illustrate operation states in the operation modes M11 to M13.

[Operation Mode M11]

In a case where the vehicle 200 starts traveling in a cold region, for example, the controller 30 may set the operation mode M to the operation mode M11. In the operation mode M11, the cooling system 2 may use the motor 15 as a heat source to warm up the battery 13.

The controller 30 may set the operation mode M to the operation mode M11 in a case where, as illustrated in FIG. 9, the motor temperature Tm is below the threshold temperature T1, the inverter temperature Tinv is below the threshold temperature T2, and the battery temperature Tb is below the threshold temperature T3. In this example, the threshold temperatures T1, T2, and T3 may respectively be 80° C., 40° C., and 40° C.

In the operation mode M11, the controller 30 may cause, as illustrated in FIGS. 9 and 10A, the switching valve A to allow the cooling medium to bypass the radiator 11 and the switching valve B to allow the cooling medium to flow via the motor 15. Hereinafter, the state where the switching valve A allows the cooling medium to bypass the radiator 11 and the state where the switching valve B allows the cooling medium to flow via the motor 15 are respectively referred to as a state S2 and a state S1. Under the states described above, the cooling medium 9 may circulate in order of the motor 15, the pump 12, the battery 13, the inverter 14, and the motor 15. As a result, it is possible in the cooling system 2 to use the motor 15 as a heat source to warm up the battery 13, as with the case in the first example embodiment described above and illustrated in FIG. 4A.

[Operation Mode M12]

In a case where, in the cooling system 2 operating in the operation mode M11, the battery 13 is fully warmed up in a state where the motor 15 is not yet fully heated, for example, the controller 30 may set the operation mode M to the operation mode M12. In the operation mode M12, the cooling system 2 may use the motor 15 as a heat source to warm up the transmission 17. The cooling system 2 may as well use the radiator 11 to cool down the battery 13 and the inverter 14.

The controller 30 may set the operation mode M to the operation mode M12 in a case where, as illustrated in FIG. 9, the motor temperature Tm is below the threshold temperature T1 and the battery temperature Tb is equal to or above the threshold temperature T3. In this example, the threshold temperatures T1 and T3 may respectively be 80° C. and 40° C.

In the operation mode M12, the controller 30 may cause, as illustrated in FIGS. 9 and 10B, the switching valve A to allow the cooling medium to flow via the radiator 11 and the switching valve B to allow the cooling medium to bypass the motor 15. Hereinafter, the state where the switching valve A allows the cooling medium to flow via the radiator 11 and the state where the switching valve B allows the cooling medium to bypass the motor 15 are also respectively referred to as the state S1 and the state S2. Under the states described above, the cooling medium 9 may circulate in order of the radiator 11, the pump 12, the battery 13, the inverter 14, and the radiator 11. As a result, as with the case in the first example embodiment described above and illustrated in FIG. 4B, it is possible in the cooling system 2 to use the motor 15 as a heat source to warm up the transmission 17. It is further possible to use the radiator 11 to cool down the battery 13 and the inverter 14.

[Operation Mode M13]

In a case where, in the cooling system 2 operating in the operation mode M12, the motor 15 is fully heated, for example, the controller 30 may set the operation mode M to the operation mode M13. In the operation mode M13, the cooling system 2 may use the radiator 11 to cool down the battery 13, the inverter 14, and the motor 15.

The controller 30 may set the operation mode M to the operation mode M13 in a case where, as illustrated in FIG. 9, the motor temperature Tm is equal to or above the threshold temperature T1 and the battery temperature Tb is equal to or above the threshold temperature T3. In this example, the threshold temperatures T1 and T3 may respectively be 80° C. and 40° C.

In the operation mode M13, the controller 30 may cause, as illustrated in FIGS. 9 and 10C, the switching valve A to allow the cooling medium to flow via the radiator 11 and the switching valve B to allow the cooling medium to flow via the motor 15. Hereinafter, the state where the switching valve A allows the cooling medium to flow via the radiator 11 and the state where the switching valve B allows the cooling medium to flow via the motor 15 are also respectively referred to as the state S1 and the state S1. Under the states described above, the cooling medium 9 may circulate in order of the radiator 11, the pump 12, the battery 13, the inverter 14, the motor 15, and the radiator 11. As a result, as with the case in the first example embodiment described above and illustrated in FIG. 4C, it is possible in the cooling system 2 to use the radiator 11 to cool down the battery 13, the inverter 14, and the motor 15.

Note that the operation mode M11 may serve as a "first mode" in one embodiment of the technology. The operation mode M12 may serve as a "second mode" in one embodiment of the technology. The operation mode M13 may serve as a "third mode" in one embodiment of the technology.

[Operation of Switching Valves A and B]

The switching valves A and B may be controlled by the controller 30 on the basis of the motor temperature Tm, the inverter temperature Tinv, and the battery temperature Tb.

In a specific but non-limiting example, the controller 30 may cause, as illustrated in FIG. 9, the switching valve A to allow the cooling medium to bypass the radiator 11 to attain the state S2 in a case where the battery temperature Tb is below the threshold temperature T3. In this example, the threshold temperature T3 may be 40° C.

The controller 30 may further cause, as illustrated in FIG. 9, the switching valve B to allow the cooling medium to flow via the motor 15 to attain the state S1 in a case where at least one of a first condition or a second condition described below is satisfied. The first condition may denote that the motor temperature Tm is equal to or above the threshold temperature T1. In this example, the threshold temperature T1 may be 80° C. The second condition may denote that the inverter temperature Tinv is below the threshold temperature T2 and the battery temperature Tb is below the threshold temperature T3. In this example, the threshold temperatures T2 and T3 may respectively be 40° C. and 40° C.

As described above, the switching valves A and B may be controlled by the controller 30 on the basis of the motor temperature Tm, the inverter temperature Tinv, and the battery temperature Tb. The cooling system 2 may thus operate in one of the three operation modes M11 to M13 described above.

[Transition of Operation Mode M]

Figure 11:
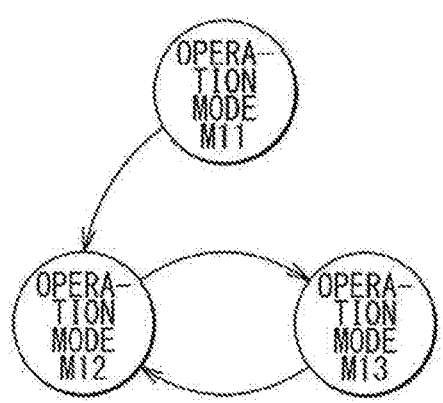
FIG. 11 is a state transition diagram illustrating transition of an operation mode in the cooling system illustrated in FIG. 8.

FIG. 11 illustrates transition of the operation mode M in the cooling system 2. In a case where the vehicle 200 starts traveling in a cold region, for example, the controller 30 may set the operation mode M to the operation mode M11. In a case where, in the cooling system 2 operating in the operation mode M11, the battery 13 is fully warmed up in a state where the motor 15 is not yet fully heated, for example, the operation mode M may transition from the operation mode M11 to the operation mode M12. In a case where, in the cooling system 2 operating in the operation mode M12, the motor 15 is fully heated, for example, the operation mode M may transition from the operation mode M12 to the operation mode M13. In a case where, in the cooling system 2 operating in the operation mode M13, the motor 15 is fully cooled down, for example, the operation mode M may transition from the operation mode M13 to the operation mode M12.

As described above, the cooling system 2 may be provided with the two switching valves A and B in the circulation channel 10. The arrangement makes it possible to omit the switching valve C. The arrangement further makes it possible to reduce a number of the operation modes M. It is therefore possible to simplify the cooling system 2 in configuration, compared with the cooling system 1 according to the first example embodiment described above.

As described above, the second example embodiment may be provided with the two switching valves in the circulation channel, making it possible to simplify the cooling system in configuration. Other effects may be similar to the effects of the first example embodiment described above.

Although the technology has been described with reference to some examples including the example embodiments and the modification example described above, the technology is not limited to the examples described above. Various changes and modifications may be made to any embodiment without departing from the scope of the technology.

In the examples described above, for example, the threshold temperature T1 pertaining to the motor temperature Tm may be set to 80° C., the threshold temperature T2 pertaining to the inverter temperature Tinv may be set to 40° C., and the threshold temperature T3 pertaining to the battery temperature Tb may be set to 40° C. However, the threshold temperatures are not limited to the values in the examples described above. It is possible to appropriately set the threshold temperatures. In the examples, the threshold temperature T2 and the threshold temperature T3 may be equal to each other. However, the threshold temperatures are not limited to the examples described above. The threshold temperatures may differ from each other.

In the examples described above, it may be detected whether the motor temperature Tm is equal to or above the threshold temperature T1, i.e., Tm≥T1, or below the threshold temperature T1, i.e., Tm<T1, for example. However, what is detected is not limited to the examples. For example, it may be detected whether the motor temperature Tm is above the threshold temperature T1, i.e., Tm>T1, or equal to or below the threshold temperature T1, i.e., Tm≤T1. The same applies to the inverter temperature Tinv and the battery temperature Tb.

In the examples described above, any embodiment of the technology is applicable to a hybrid electric vehicle, for example. However, a target to which the technology is applicable is not limited to the examples. Instead of the hybrid electric vehicle, any embodiment of the technology is applicable to an electric vehicle, for example.

The example effects described above are merely illustrative and non-limiting. Any embodiment may achieve an effect other than the example effects described above.

The controller 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 20 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A cooling system comprising:
   a circulation channel configured to allow a cooling medium to circulate in order of a radiator, a pump, a battery, an inverter, a motor, and the radiator;
   a first switching valve configured to allow the cooling medium to bypass the radiator in the circulation channel such that the cooling medium circulates from the motor through the first switching valve into the pump and back to the battery;
   a second switching valve configured to allow the cooling medium to bypass the motor in the circulation channel; and
   a controller configured to control the first switching valve and the second switching valve on a basis of a battery temperature of the battery, an inverter temperature of the inverter, and a motor temperature of the motor,
   wherein the circulation channel comprises a section that directly connects the battery to the inverter such that the cooling medium flows directly from the battery to the inverter.

2. The cooling system according to claim 1, further comprising a third switching valve configured to allow the cooling medium to bypass the battery in the circulation channel,
   wherein the controller is configured to control the third switching valve in addition to the first switching valve and the second switching valve.

3. The cooling system according to claim 2, wherein the controller is configured to control:
in a first mode:
the first switching valve to allow the cooling medium to bypass the radiator;
the second switching valve to allow the cooling medium to flow via the motor; and
the third switching valve to allow the cooling medium to flow via the battery;
in a second mode:
the first switching valve to allow the cooling medium to flow via the radiator;
the second switching valve to allow the cooling medium to bypass the motor; and
the third switching valve to allow the cooling medium to flow via the battery; and
in a third mode:
the first switching valve to allow the cooling medium to flow via the radiator;
the second switching valve to allow the cooling medium to flow via the motor; and
the third switching valve to allow the cooling medium to flow via the battery.

4. The cooling system according to claim 3, wherein the controller is configured to control:
in a fourth mode:
the first switching valve to allow the cooling medium to flow via the radiator;
the second switching valve to allow the cooling medium to flow via the motor; and
the third switching valve to allow the cooling medium to bypass the battery; and
in a fifth mode:
the first switching valve to allow the cooling medium to flow via the radiator;
the second switching valve to allow the cooling medium to bypass the motor; and
the third switching valve to allow the cooling medium to bypass the battery.

5. The cooling system according to claim 2, wherein the controller is configured to control the first switching valve to allow the cooling medium to bypass the radiator in a case where the motor temperature is below a first threshold temperature, the inverter temperature is below a second threshold temperature, and the battery temperature is below a third threshold temperature.

6. The cooling system according to claim 3, wherein the controller is configured to control the first switching valve to allow the cooling medium to bypass the radiator in a case where the motor temperature is below a first threshold temperature, the inverter temperature is below a second threshold temperature, and the battery temperature is below a third threshold temperature.

7. The cooling system according to claim 4, wherein the controller is configured to control the first switching valve to allow the cooling medium to bypass the radiator in a case where the motor temperature is below a first threshold temperature, the inverter temperature is below a second threshold temperature, and the battery temperature is below a third threshold temperature.

8. The cooling system according to claim 2, wherein:
the controller is configured to control the second switching valve to allow the cooling medium to flow via the motor in a case where at least one of a first condition or a second condition is satisfied;
the first condition denotes that the motor temperature is above a first threshold temperature; and
the second condition denotes that the inverter temperature is below a second threshold temperature and the battery temperature is below a third threshold temperature.

9. The cooling system according to claim 3, wherein:
the controller is configured to control the second switching valve to allow the cooling medium to flow via the motor in a case where at least one of a first condition or a second condition is satisfied;
the first condition denotes that the motor temperature is above a first threshold temperature; and
the second condition denotes that the inverter temperature is below a second threshold temperature and the battery temperature is below a third threshold temperature.

10. The cooling system according to claim 4, wherein:
the controller is configured to control the second switching valve to allow the cooling medium to flow via the motor in a case where at least one of a first condition or a second condition is satisfied;
the first condition denotes that the motor temperature is above a first threshold temperature; and
the second condition denotes that the inverter temperature is below a second threshold temperature and the battery temperature is below a third threshold temperature.

11. The cooling system according to claim 2, wherein:
the controller is configured to control the third switching valve to allow the cooling medium to flow via the battery in a case where either one of a third condition and a fourth condition is satisfied;
the third condition denotes that the motor temperature is below a first threshold temperature, the inverter temperature is below a second threshold temperature, and the battery temperature is below a third threshold temperature; and
the fourth condition denotes that the battery temperature is above the third threshold temperature.

12. The cooling system according to claim 3, wherein:
the controller is configured to control the third switching valve to allow the cooling medium to flow via the battery in a case where either one of a third condition and a fourth condition is satisfied;
the third condition denotes that the motor temperature is below a first threshold temperature, the inverter temperature is below a second threshold temperature, and the battery temperature is below a third threshold temperature; and
the fourth condition denotes that the battery temperature is above the third threshold temperature.

13. The cooling system according to claim 4, wherein:
the controller is configured to control the third switching valve to allow the cooling medium to flow via the battery in a case where either one of a third condition and a fourth condition is satisfied;
the third condition denotes that the motor temperature is below a first threshold temperature, the inverter temperature is below a second threshold temperature, and the battery temperature is below a third threshold temperature; and
the fourth condition denotes that the battery temperature is above the third threshold temperature.

14. The cooling system according to claim 1, wherein the controller is configured to control:
in a first mode:
the first switching valve to allow the cooling medium to bypass the radiator; and
the second switching valve to allow the cooling medium to flow via the motor;

in a second mode:
: the first switching valve to allow the cooling medium to flow via the radiator; and
: the second switching valve to allow the cooling medium to bypass the motor; and in a third mode:
: the first switching valve to allow the cooling medium to flow via the radiator; and
: the second switching valve to allow the cooling medium to flow via the motor.

15. The cooling system according to claim 14, wherein the controller is configured to control the first switching valve to allow the cooling medium to bypass the radiator in a case where the battery temperature is below a third threshold temperature.

16. The cooling system according to claim 14, wherein:
: the controller is configured to control the second switching valve to allow the cooling medium to flow via the motor in a case where at least one of a first condition or a second condition is satisfied;
: the first condition denotes that the motor temperature is above a first threshold temperature; and
: the second condition denotes that the inverter temperature is below a second threshold temperature and the battery temperature is below a third threshold temperature.

17. The cooling system according to claim 15, wherein:
: the controller is configured to control the second switching valve to allow the cooling medium to flow via the motor in a case where at least one of a first condition or a second condition is satisfied;
: the first condition denotes that the motor temperature is above a first threshold temperature; and
: the second condition denotes that the inverter temperature is below a second threshold temperature and the battery temperature is below a third threshold temperature.

18. The cooling system according to claim 1, wherein the radiator, the battery, the inverter, and the motor are sequentially connected via the circulation channel such that the cooling medium circulates directly in order between the radiator, the battery, the inverter, and the motor.

19. The cooling system according to claim 1, wherein the circulation channel comprises a section that directly connects the radiator to the battery such that the cooling medium flows from the radiator only to the battery.

20. The cooling system according to claim 1, wherein the section that directly connects the battery to the inverter is devoid of a switching valve.

* * * * *